E. F. Sherman.
Corn-Sheller.
No. 74,726.        Patented Feb. 18, 1868.
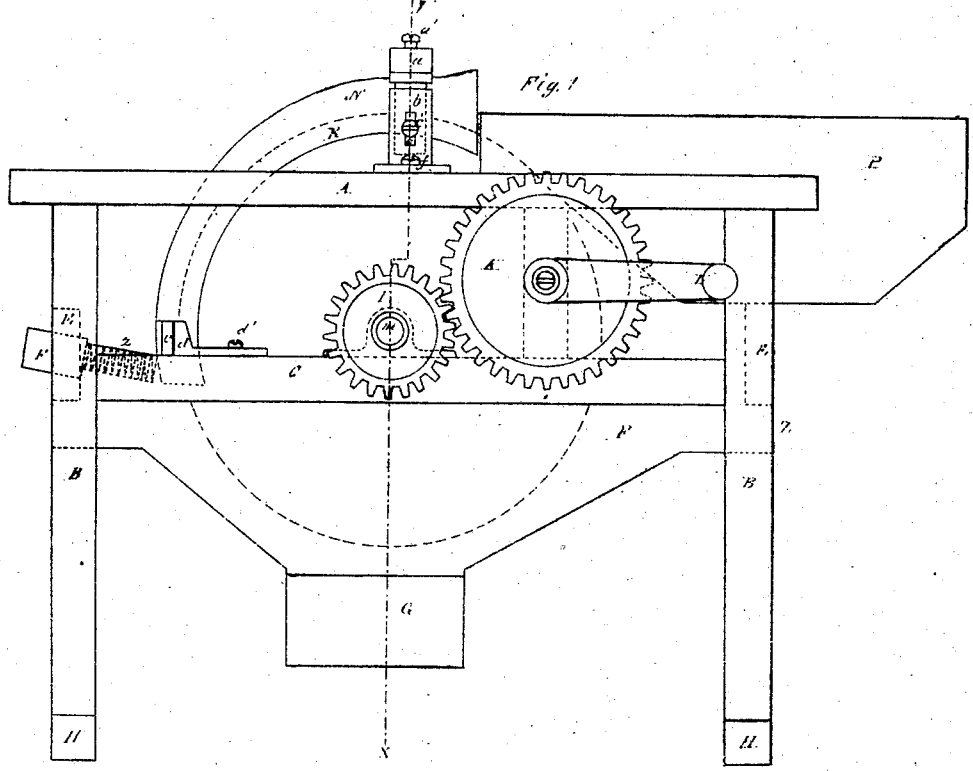
Witnesses
J. Edwin Sherman
M. B. Rust
Inventor
E. F. Sherman
by Buckland & Curtis
his attorneys

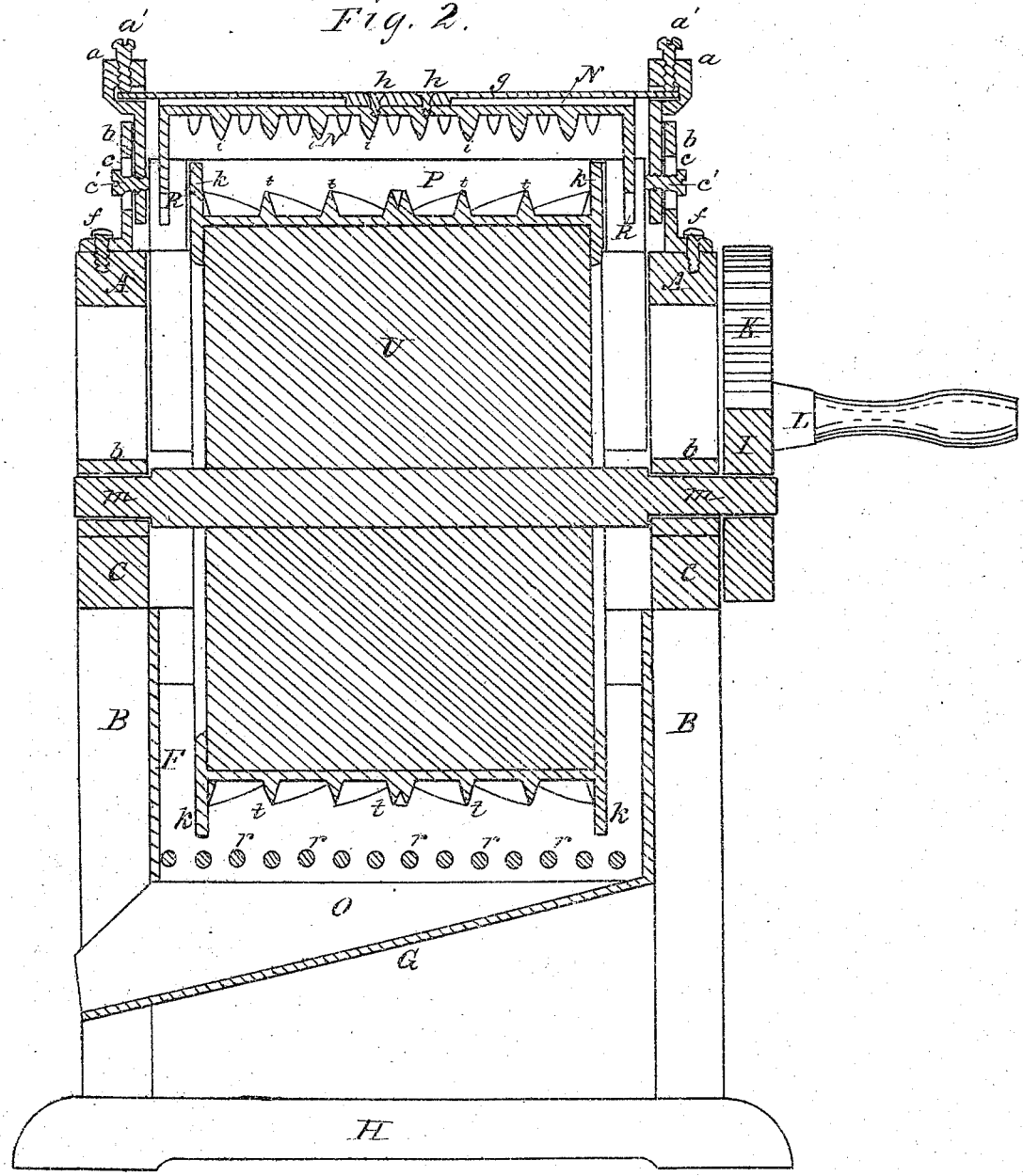

United States Patent Office.

EDWIN F. SHERMAN, OF CHICOPEE, MASSACHUSETTS.

Letters Patent No. 74,726, dated February 18, 1868.

IMPROVEMENT IN CORN-SHELLERS.

The Schedule referred to in these Letters Patent and making part of the same.

TO ALL WHOM IT MAY CONCERN:

Be it known that I, EDWIN F. SHERMAN, of Chicopee, in the county of Hampden, and Commonwealth of Massachusetts, have invented certain new and useful Improvements in Machines for Shelling Corn, or Corn-Shellers; and I do hereby declare that the following is a full and exact description thereof, reference being had to the accompanying drawings, and to the letters of reference marked thereon, making a part of this specification. In said drawings—

Figure 1 is a front elevation of said machine,

Figure 2 is a transverse vertical section through the line V X, fig. 1, and

Figure 3 is a plan of the shelling-cylinder.

The nature of my invention consists in combining a revolving cylinder, having ridges arranged in a regular manner upon its convex surface, with a curved adjustable bonnet, having its concave surface armed with numerous projections or teeth, in such manner that ears of corn passing into the space between the cylinder and the bonnet will, by the action of the ridges upon the revolving cylinder, and of the teeth upon the bonnet, be stripped of kernels. The main parts of my improved corn-sheller are as follows:

First. A frame for supporting the various parts of the machine, with a hopper, from which the ears of corn are fed into the shelling-apparatus, and a sloping bottom, separator, and spout.

Second. A shelling-cylinder, revolving in bearings attached to the frame, and capable of being turned rapidly by the use of geared wheels.

Third. A toothed bonnet, the concave surface of which conforms nearly to the curved surface of the cylinder, and covers about one-fourth of such surface, and which is attached to the frame in such manner as to be movable to some extent, and to press the ears of corn upon the shelling-cylinder.

The construction of my invention is as follows: The frame consists of top sills A A at the sides and ends of the machine, legs B B, girts C C, E E', and feet H H, all strongly framed together in the usual manner. A box, P, which I denominate a hopper, is supported by the girt E', and is so shaped as to allow the operator to easily draw the corn forward upon the surface of the cylinder with one hand, while turning the winch with the other. I do not confine myself, however, to the described form of hopper.

Side-pieces F F support a bottom, which is of such form as to leave only a sufficient space between the cylinder and bottom for the free passage of the cobs. An aperture is left at the lowest part of the bottom, across which aperture is placed a grating or separator, formed by bars r r. These bars are set at such distance apart as to prevent the cobs from passing through, while the shelled corn readily falls between them and into the spout beneath.

The shelling-cylinder is supported upon journals m m, which turn in bearings l l fastened to the girts C C. A geared wheel, I, keyed upon the journal m, meshes into a larger geared wheel, K, which is turned by the winch L. As it is desirable to turn the shelling-cylinder more rapidly than can be done by a hand-winch applied directly to the journal m, the requisite speed of revolution is obtained by the use of geared wheels of unequal diameter, the same being preferable to belts and pulleys for the purpose.

To form a durable ridged convex surface upon the cylinder, I use curved plates or lags of cast metal, each having flanges, k k, at the ends, and having ridges upon the convex surface, as hereafter described. In actual construction for use, I use two circular disks or "spiders," to support the lags, which are bolted to the disk or spider, the disks forming the ends of the cylinder, and the lags forming the curved surface. If the cylinder were made of wood, the lags could be applied to it, so as to form, in like manner, a continuous metallic surface.

When the lags are fastened in place upon the spiders, (or upon the wooden cylinder,) the convex surface will have, at each end, a flange, k, projecting to the height of one inch or more, for the purpose of preventing the escape of the ears of corn at the ends of the cylinder. The ridges, t t, upon the surface of each lag, are, in section, of the form of an inverted V, and are placed in oblique line upon the convex surface. These ridges may be continued in parallel lines across the surface of the lag, all running obliquely to the length of the lag, or they may be made to diverge uniformly from a line across the middle of the length of the lag, as represented. The arrangement of the ridges, in lines oblique to the length of the lag, I believe to be essential to the efficiency of my invention, and to be novel, however the same may be arranged upon the surface of the cylinder.

For the construction of any given machine, I make all the lags of the same form and conformation of surface, but prefer to apply them to the "spiders" or upon the wooden cylinders, as follows:

I place every alternate lag in a reversed position on the cylinder, with regard to the direction of the ridges, and, in so doing, use an even number of lags in each machine, and arrange each pair of lags so that the coincident ridges upon the two will meet at an angle to each other. By the described formation of the curved surface of the cylinder, an ear of corn, in passing between the cylinder and bonnet, will be moved by the ridges upon one lag toward the end of the cylinder, and by the ridges upon the next lag toward the middle, or successively outward and inward. I do not confine myself, however, to the particular arrangement described, whereby the coincident ridges are made to meet at an angle, as ridges running obliquely, and arranged around the entire surface of the cylinder in a uniform direction, would make an effective shelling-surface. Neither do I confine myself to forming the surface of the cylinder by means of lags or plates, as a cylinder might be cast entire, with the same conformation of surface, as described.

The bonnet N has a curved back and curved side-pieces R R, and is of such a length that the side-pieces project beyond the flanges $k\ k$ on the cylinder, and overlap them, so that no ears of corn can escape from between the cylinder and bonnet. The concave surface of the bonnet coincides nearly with the convex surface of the cylinder, and is armed with numerous projections or teeth, $i\ i\ i$. To render this bonnet movable to a certain extent, and so that it can adjust itself to different sizes of ears, and press the ears upon the cylinder, it is attached to a spring-bar, $g$, at the top, by screws $h\ h$, and works against a spiral spring, $z$, at the middle of its lower edge. The ends of the spring-bar $g$ rest in mortises in the sliding standards $a\ a$, and are held in the mortises by the set-screws $a'\ a'$. The upper edge of the bonnet can, therefore, be set at a greater or less distance from the cylinder by raising or lowering the sliding standards, which move up and down in grooves in the fixed standards $b\ b$, and are held in position by the set-screws $c'\ c'$. Slots $e\ e$, in the fixed standards, allow considerable movement to the set-screws $c'\ c'$.

The spiral spring $z$ is secured to a pin or mandrel, $F'$, secured to the girt E, and tends to press the bonnet towards the cylinder. To prevent the bonnet from coming in contact with the cylinder, ears $e\ e$ project on each side of the bonnet, and rest against stops $d\ d$. Set-screws $d\ d$, passing through slots in the stops $d\ d$, allow the stops to be set at different points on the girts C, C, so that the bonnet can be kept at a greater or less distance from the shelling-cylinder.

By the means described, the bonnet can be adjusted at a proper distance from the cylinder, and will then be free to adjust itself, to a sufficient extent, to the material passing through the machine.

The operation of my invention is as follows: The cylinder being revolved from right to left, and ears of corn being fed upon its surface, from the hopper, will be carried between the cylinder and bonnet, and there stripped of corn. The teeth upon the bonnet serve to detain the ears of corn rather than to shell the kernels from the cobs, although some corn is removed by the action of the teeth, but the ridges upon the cylinder are more effective in shelling than the teeth, and remove the kernels with great rapidity and thoroughness. The cobs and shelled corn pass down the sloping bottom to the separator, through which the shelled corn falls into the spout, while the cobs will be moved forward by the ridges upon the cylinder, and discharged at $z'$.

I am aware that "ribbed" cylinders have been used with a "concave pressure-plate," as in the Letters Patent granted to S. J. Parmele, bearing date December 24, 1861, but I believe the conformation and arrangement of the ridged shelling-surface hereinbefore described to differ materially from the "ribbed" cylinders heretofore in use, and I disclaim any and every part of the invention of said Parmele, as appearing in said Letters Patent.

What I therefore claim as my invention, and desire to secure by Letters Patent, is—

1. The combination of a shelling-cylinder, having ridges placed obliquely, as described, with the adjustable toothed bonnet, the whole arranged and operating substantially as set forth.

2. The flanges $k\ k$, in combination with the obliquely-placed ridges of a corn-sheller, substantially as and for the purpose set forth.

3. Reversing the position of each alternate lay of ridges on the cylinder of a corn-sheller, substantially as and for the purposes set forth.

4. The V-shaped ridges, placed on the cylinder of a corn-sheller in such a manner that, in each separate lay, their V-points shall approach the centre of the periphery of the cylinder, while the V-arms diverge from the centre in opposite directions, substantially as and for the purposes described.

EDWIN F. SHERMAN.

Witnesses:
 J. P. BUCKLAND,
 OGDEN GRISWOLD.